(12) United States Patent
Romero Elizondo et al.

(10) Patent No.: US 10,829,085 B2
(45) Date of Patent: Nov. 10, 2020

(54) SEAT BELT RETRACTOR

(71) Applicant: TK HOLDINGS INC., Auburn Hills, MI (US)

(72) Inventors: Daniel Alejandro Romero Elizondo, Nuevo León (MX); Juan Carols Veloz Soto, Nuevo León (MX); Rogelio Adrian Garcia Pacheco, Nuevo León (MX)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 89 days.

(21) Appl. No.: 15/898,640

(22) Filed: Feb. 18, 2018

(65) Prior Publication Data

US 2019/0256040 A1   Aug. 22, 2019

(51) Int. Cl.
| | |
|---|---|
| *B60R 22/36* | (2006.01) |
| *B60R 22/415* | (2006.01) |
| *B60R 22/46* | (2006.01) |
| *B60R 22/48* | (2006.01) |

(52) U.S. Cl.
CPC ........ *B60R 22/415* (2013.01); *B60R 22/4676* (2013.01); *B60R 2022/468* (2013.01); *B60R 2022/4825* (2013.01)

(58) Field of Classification Search
CPC .............................. B60R 22/36; B60R 22/415
See application file for complete search history.

(56) References Cited

U.S. PATENT DOCUMENTS

| | | | |
|---|---|---|---|
| 4,948,066 | A | 8/1990 | Matsumoto et al. |
| 4,996,395 | A | 2/1991 | Tada |
| 5,518,197 | A | 5/1996 | Gray |
| 5,934,596 | A | 8/1999 | Gorman et al. |
| 7,384,014 | B2 | 6/2008 | Ver Hoven et al. |
| 7,891,596 | B2 | 2/2011 | Holbein et al. |
| 7,992,817 | B2 * | 8/2011 | Holbein ................. B60R 22/46 242/382.1 |
| 9,150,193 | B2 | 10/2015 | Vanwambeke et al. |
| 2003/0015616 | A1 | 1/2003 | Palliser et al. |
| 2006/0186250 | A1 * | 8/2006 | Takamatsu ............ B60R 22/415 242/382 |
| 2008/0012285 | A1 | 1/2008 | Holbein et al. |
| 2008/0116309 | A1 * | 5/2008 | Takamatsu .............. B60R 22/36 242/374 |
| 2012/0153066 | A1 * | 6/2012 | Takamatsu .............. B60R 22/36 242/382 |

(Continued)

FOREIGN PATENT DOCUMENTS

| | | |
|---|---|---|
| EP | 1 298 017 B1 | 11/2004 |
| WO | WO 2016/196464 A1 | 12/2016 |

*Primary Examiner* — Sang K Kim
(74) *Attorney, Agent, or Firm* — Gordon Rees Scully Mansukhani, LLP (57) ABSTRACT

A seat belt retractor including a spool and a measurement mechanism for determining a measure of the amount of seat belt webbing unwound from the spool. The measurement mechanism includes cycloidal gear transmission. A sensor is provided for detecting movement of a magnet mounted on a sensing gear and a controller may be provided for determining a measure indicating the amount of rotation of the spool and the amount of webbing withdrawal based on the movement of the magnet.

15 Claims, 8 Drawing Sheets

(56) References Cited

U.S. PATENT DOCUMENTS

| | | | |
|---|---|---|---|
| 2013/0256442 A1* | 10/2013 | Yanagawa | B60R 22/415 |
| | | | 242/382.2 |
| 2014/0028075 A1 | 1/2014 | Kohlndorfer et al. | |
| 2015/0217722 A1* | 8/2015 | Osada | B60R 22/40 |
| | | | 242/384.1 |
| 2016/0214554 A1 | 7/2016 | Shimazu et al. | |
| 2017/0197580 A1 | 7/2017 | Lee et al. | |

* cited by examiner

SEAT BELT RETRACTOR

BACKGROUND

The present application relates generally to the field of retractors for use in occupant restraint systems (e.g., seatbelt systems). These seat belt systems include a retracting or winding device to retract or wind up any excess amount of seat belt webbing that has been extended after the seat belt is latched.

The retractor also may include an automatic locking device referred to as an automatic locking retractor (ALR) which is configured to lock the retractor to prevent further payout of the seat belt webbing. The retractor may be configured to lock when there is an abrupt or sharp pulling of the webbing.

The seat belt retractor may also include a mechanism (e.g., a motor) for winding up the seat belt. The motor may be used for controlling the tension of the seat belt when the seat belt is being worn by the occupant of the vehicle. Thus, the motorized retractor may be configured to operate in both directions to wind and unwind the belt. The retractor system may also include a pre-tensioning device (e.g., a pyrotechnic driven device) for tensioning the seat belt.

In retractor systems it is useful to be able to determine the amount of unwinding or withdrawal of the seat belt webbing in order to facilitate operation of the retractor and one or more of its associated features (e.g., pretensioning, motor driving winding and/or unwinding, spring winding, etc.).

SUMMARY

According to one embodiment disclosed herein, a seat belt retractor is provided that includes a spool for winding and unwinding a seat belt webbing. The retractor includes a measurement mechanism for determining a measure of the amount of seat belt webbing unwound from the spool. The measurement mechanism includes a cycloidal gear transmission for transferring the rotational movement of the spool to rotational movement of a sensing gear. The rotational movement of the sensing gear is detected by a first sensor and a second sensor is provided for detecting the angular position of the spool. The first and second sensors provide signals to a controller so that the controller can determine a measure of the amount of webbing unwound from the spool based on both the spool angle position and the spool rotation amount.

According to alternative embodiments of the retractor the angular position sensor may be omitted and the retractor may be configured to include an automatic locking mechanism (ALR).

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages will become apparent from the following description, appended claims, and the accompanying exemplary embodiments shown in the drawings, which are briefly described below.

DETAILED DESCRIPTION

Disclosed herein are retractor mechanisms (e.g., retractors) that are configured to include energy management devices that absorb energy and load in a progressive manner, such as by starting off with a relative lower level of energy absorption (e.g., load resistance), then as the occupant that is secured by the webbing displaces (e.g., deflects) the retractor increases the level of load and energy absorption (e.g., load resistance). The occupant restraint systems having retractors with energy management devices (e.g., load absorbing members), as disclosed herein, are configured to limit the chest deflection (or displacement) and compression of the occupant. By initially providing a relative low level of energy absorption, the retractors, as disclosed herein, may advantageously provide improved performance for small occupants (e.g., fifth percentile occupants). Also, by providing a progressive level of load and energy absorption, the retractors, as disclosed herein, are able to restrain larger occupants (e.g., ninety-fifth percentile occupants) to limit their deflection, since the relative lower level of energy absorption ideal for smaller occupants may not be ideal to limit the deflection of the larger occupants during vehicle dynamic events. In other words, the retractors, as disclosed herein, may advantageously provide an efficient method for limiting the deflection of occupants that range in size (e.g., from small to large occupants) to provide favorable performance, such as by employing an energy management system that provides a progressive manner of load and energy absorption during dynamic vehicle events.

Figure 1:
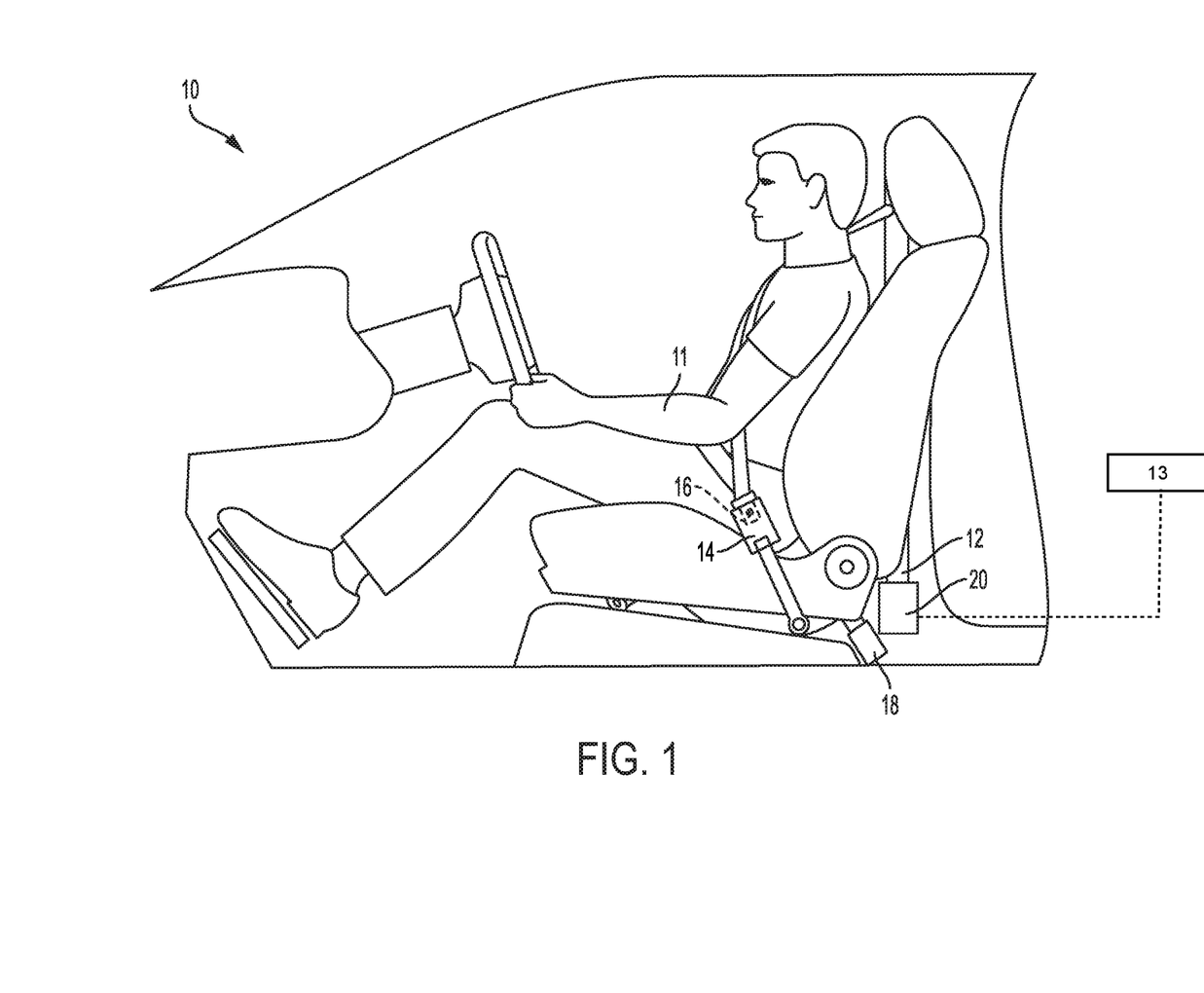
FIG. 1 is a side view of a vehicle showing an occupant restraint system in the form of a seatbelt assembly having a retractor according to an exemplary embodiment.

FIG. 1 discloses an exemplary a seat belt system 10. The seat belt system 10 is used within a vehicle to help restrain the movement of an occupant 11 during a sudden acceleration, typically resulting from a dynamic impact event of the vehicle. The term acceleration refers to the absolute value of the acceleration that the vehicle experiences, whether negative (e.g., deceleration) or positive. The seat belt system 10 includes a webbing or belt 12, a buckle 14, a tongue member 16 to engage the buckle 14, an anchor member 18, and a retractor 20. During a dynamic impact event of the vehicle, the retractor 20 may lock the webbing from extracting or unwinding, which restricts movement of the occupant. The seat belt system 10 may include one or more sensors (not shown) configured to detect a sudden acceleration of the vehicle. The acceleration sensor(s) is configured to send a signal to a controller 13 for the retractor 20. The controller 13 may be configured to activate the retractor as appropriate depending on whether the sensor detects a low or high acceleration event.

Figure 2:
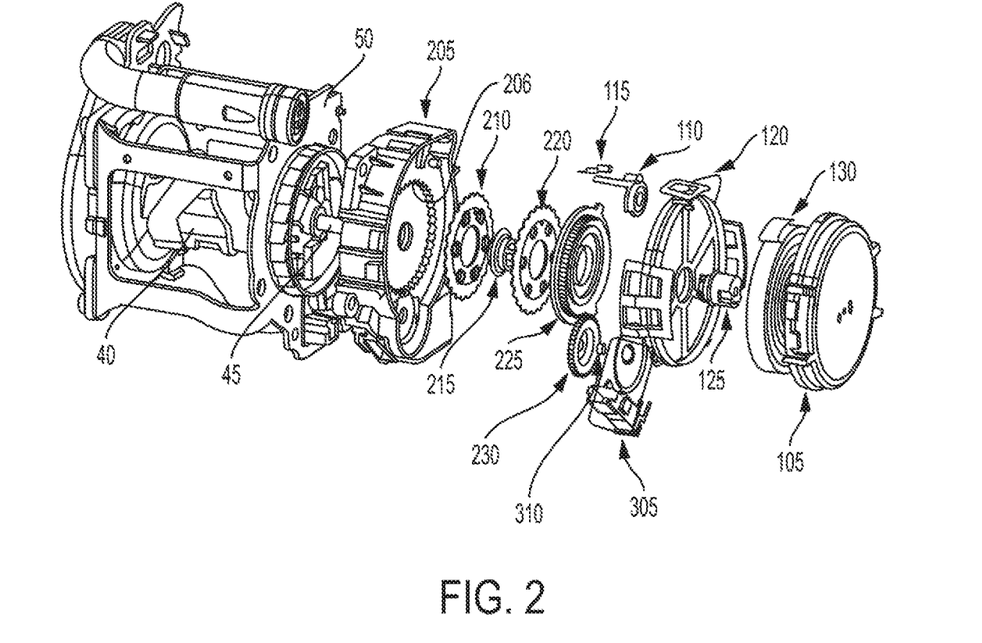
FIG. 2 is an exploded view of a seat belt retractor.
Figure 3:
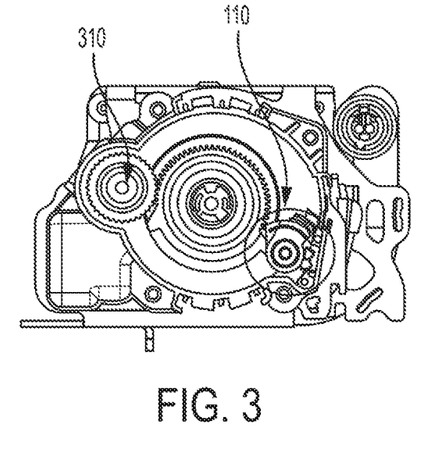
FIG. 3 is a side view of the retractor of FIG. 2 taken from a plane located between a spring plate and a secondary or sun gear.
Figure 4:
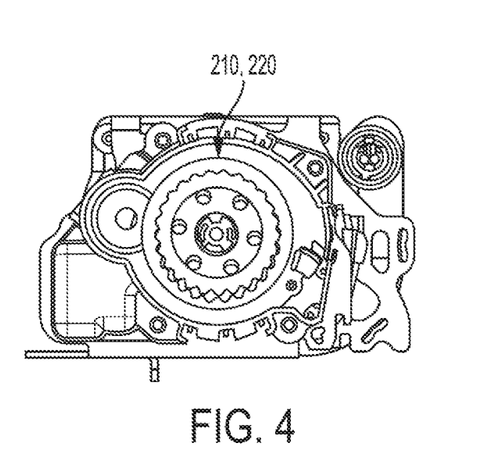
FIG. 4 is side view of the retractor of FIG. 2 from a plane located between a cycloidal gear and the secondary or sun gear.

As shown in FIG. 2, the spool 40 is connected to a gear core 215 via a shaft 45 that extends axially from the spool 40. The gear core 215 is connected to a transmission mechanism that is part of the belt unwinding detection system. The transmission mechanism includes at least one cycloidal gear. As shown in FIG. 2, the transmission may include a first cycloidal gear 210 and a second cycloidal gear 220 connected to the gear core 215. The cycloidal gears or gear engage corresponding gear teeth 206 located in a retainer 205 fixed to the retractor frame 50. The cycloidal gears 210, 220 transmit movement to a secondary or sun gear 225.

As mentioned above, only one cycloidal gear is required. The additional cycloidal gear (e.g., gear 220) is provided to reduce the tolerance of the movement being transmitted to the secondary gear 225. Further additional cycloidal gears could be provided (i.e., for a total of three or more) in order to improve resolution of the transmitted movement. The higher resolution or accuracy of the transmission improves the accuracy of detecting the amount of unwinding of the seat belt webbing. The cycloidal transmission functions as a reduction gear. For example, in one exemplary embodiment the reduction ratio is 27:1. Thus, in that example, 27 rotations of spool is equivalent to 1 rotation of the one or more cycloidal gears. However, the reduction ratio may vary.

Figure 13A:
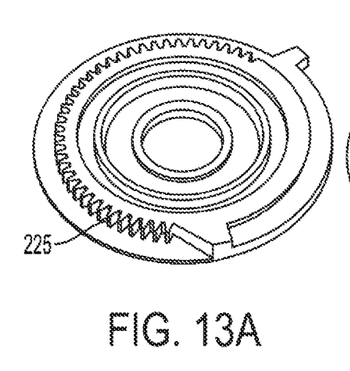
FIG. 13A is a perspective view of the front side of the secondary gear of the retractor of FIG. 2.
Figure 13B:
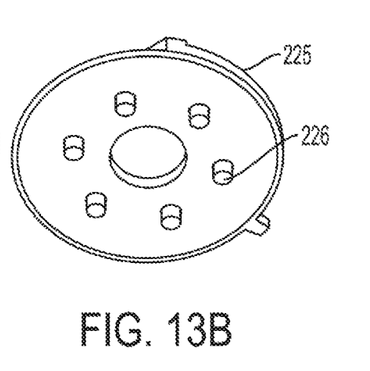
FIG. 13B is a perspective view of the rear side of the secondary gear of the retractor of FIG. 2.
Figure 14A:
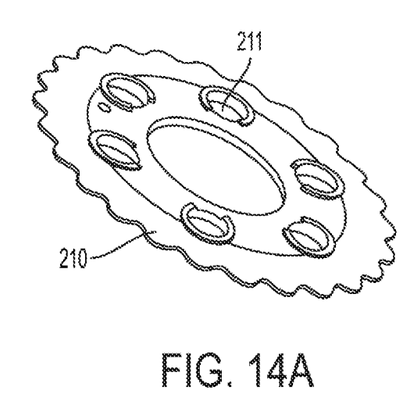
FIG. 14A is a perspective view of the first cycloidal gear of the retractor of FIG. 2.
Figure 14B:
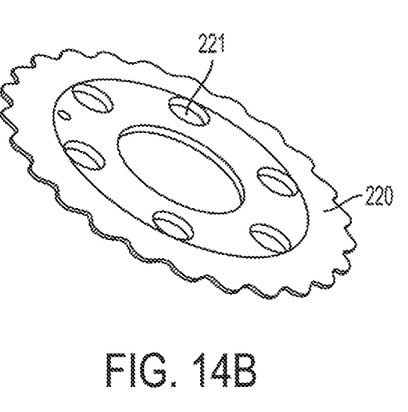
FIG. 14B is a perspective view of the second cycloidal gear of the retractor of FIG. 2.

The cycloidal gears or gear transmit the movement of the spool to the secondary gear 225 via the six pins or projections 226 located on the back side of the secondary gear 225, shown in FIG. 13B. The pins or projections 226 are guided by the holes 211, 221, located in the first and second cycloidal gears 210, 220, see FIGS. 14A and 14B. The number of pins can vary depending on precision desired. More pins produce a higher resolution or more accurate measurement and detection of the amount of belt that has been unwound from the spool.

As the secondary gear 225 rotates, an outer planetary or sensing gear 230 that is meshed with the secondary gear 225 rotates a corresponding amount. The sensing gear 230 includes a magnet 310 that is mounted so that the position of the magnet 310 changes with the rotation of the sensing gear 230. For example, as shown in the figures, the magnet 310 may be hemispherical or semicircular in shape and fits within a central opening of the sensing gear 230. A Hall effect sensor 305 is located proximate to the first magnet 310 and senses the change in position of the magnet 310. According to one embodiment, the transmission is configured so that the sensing gear 230 rotates less than one full revolution when the webbing moves from being completely wound (i.e., a fully packed retractor) to being completely unwound (i.e., condition when there is no webbing wrapped around the spool).

The retractor may be configured so that the sensing gear 230 does not rotate more than one complete revolution. The output of the sensor 305 may be correlated to the movement of the spool by considering the diameter of the spool, the thickness of webbing and the angular rotation of the sensing gear 230 based on magnet position to determine a measure of webbing unwinding position. The sensor 305 may provide a signal to a controller. The controller may be incorporated into the retractor or be located remote from the retractor and may be associated with the control of other vehicle safety equipment such as, for example, airbags, bolsters, headrests, etc. The controller is configured to acquire the data from the one or more sensors related to the angular position of the retractor and to configure the data to be transferred to a vehicle network such as the CAN bus for use by other controllers. The sensors may be configured to use SPI communication protocol. The controller may convert the data to a format suitable for the communication protocol used by the vehicle network (e.g., CAN/LAN). The use of a cycloidal transmission produces improved accuracy of determining the belt unwinding position.

Figure 5:
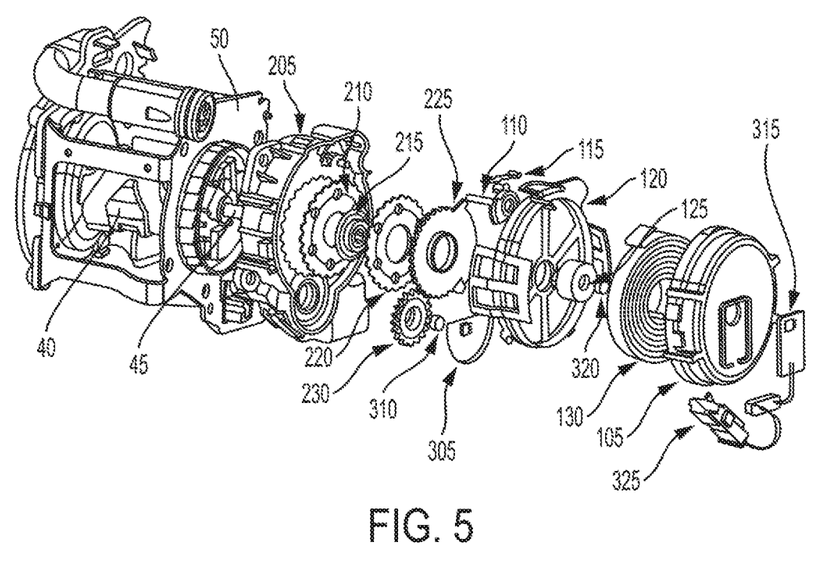
FIG. 5 is an exploded view of a seat belt retractor including two sensors for detecting rotational movement.
Figure 6:
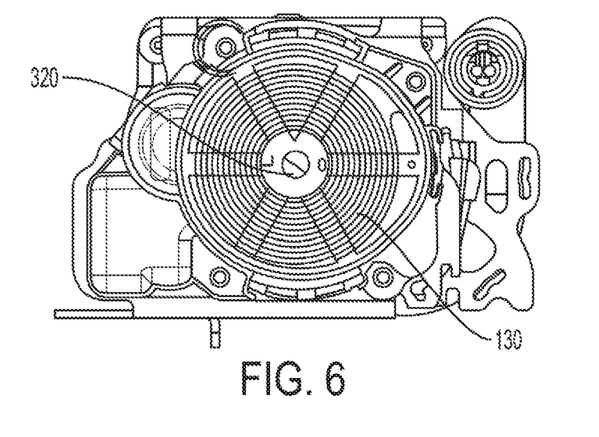
FIG. 6 is a side view of the retractor of FIG. 5 taken from a plane between a retractor spring and a cover.
Figure 7A:
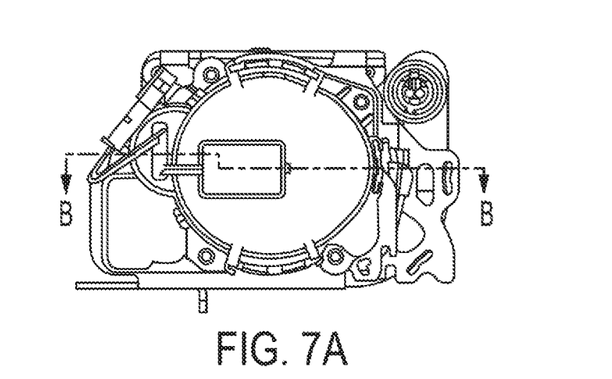
FIG. 7A is a side view of the retractor of FIG. 5.
Figure 7B:
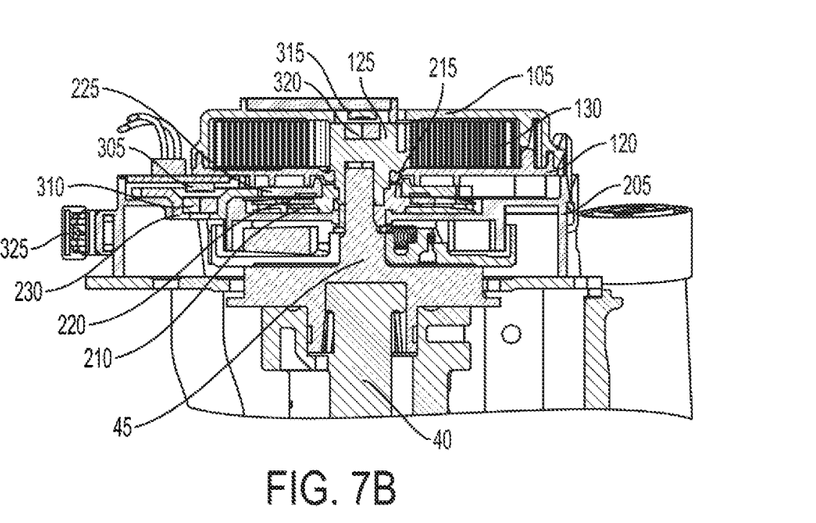
FIG. 7B is a cross sectional view of the retractor of FIG. 5 when cut along the line B-B in FIG. 7A

According to another exemplary embodiment, shown in FIG. 5, a second sensor 315 may be provided. The second sensor 315 may be a Hall effect sensor and sense the movement of a second magnet 320. The sensor 315 may be connected to the controller via a connector 325 and the first sensor 305 may include a similar connector for connecting the sensor 305 to a controller (the sensors 305, 315 may share the same controller). The sensors 305, 315 may be connected to the appropriate controller via a direct connection or via a vehicle LAN or communication bus. As shown in FIGS. 2 and 5, the retractor includes a belt winding or rewinding spring 130. The spring 130 biases the spool to rewind the webbing around the spool. As shown in FIG. 7B, the spring 130 is connected to a bushing 125 that is connected to a shaft 45 that extends from the spool 40 into the belt unwinding measurement mechanism that includes sensors 305 and 315. As shown in FIG. 2, a spring plate 120 provides a mounting surface for the bushing 125 and the spring 130. The spring 130 and bushing 125 are housed within a cover 105. Preferably, the second magnet 320 is mounted on the bushing 125. The second magnet 320 rotates at the same rate as the spool 40 via the shaft 140 that extends from the spool. FIGS. 7A and 7B disclose a two sensor embodiment without the presence of the optional ALR mechanism which is described further below.

Both sensors 305, 315 may be calibrated during production of the retractor. The calibration process may be used to fix the initial magnet position (i.e., to determine the angle associated with a retractor with no webbing on spool). The use of two sensors improves the accuracy and resolution of the measures used by the controller(s) to determine the amount of belt unwinding. The first sensor 305 may show some inaccuracies due to mechanical tolerance of the cycloidal transmission and the associated gear backlash. Thus, the provision of the second sensor 315 improves the accuracy and resolution of the determination of belt unwinding. There is no mechanical backlash associated with the second sensor 315.

The system including the two sensors 305, 315 may be configured to operate in the same way as a clock. Basically, the first sensor 305 is used to measure the number of rotations of the shaft and the second sensor 315 is used to determine the angular position of the shaft or spool. For example, the shaft could be determined to have completed four rotations in the extraction direction and be 110 degrees towards the completion of 360 degrees and a fifth rotation.

The determination of both the number of spool or shaft rotations and the spool or shaft angle position allows a more exact position of the webbing to be determined. As a result, the retractor design described herein provides for determining a measure of the following: an amount of webbing extracted from the spool; the direction of webbing movement (i.e., extraction or retractions); and the velocity and/or acceleration of the webbing. The accuracy of the Hall Effect sensor can depend on the range of movement of the magnet. The retractor configuration may use angular movement of the magnet of less than a full 360 degrees. In such a circumstance, the resolution of the sensor output signal may be improved by scaling the range used in the program or application in the controller. In this manner, the full resolution of the output of the sensor is automatically scaled to the programmed angular range which is at least 18 degrees. The range may be specified from a start position to either a stop position or a value of the angular range. The angle associated with a retractor with no webbing on spool may be determined using a calibration that detects the angle on, preferably, three different occasions. A preferred tolerance of the Hall effect sensors would be minimal with a correlation preferably set so that one degree of rotation would be equivalent to 5-8 mm of extraction distance of the webbing.

According to the disclosed embodiments, an optional ALR (automatically locking retractor) feature may be provided. ALR functionality of the seat belt retractor is typically activated as the seat belt webbing is secured about a child seat. Typically, the ALR feature is activated—turned "ON" when most if not all of the seat belt webbing is manually pulled out or protracted from the spool prior to the seat belt being placed about a child seat. Then the seat belt is released to envelop the child seat. As the last section of seat belt webbing is protracted from the spool, the retractor may enter its automatic locking mode (ALR) mode of operation.

Figure 8:
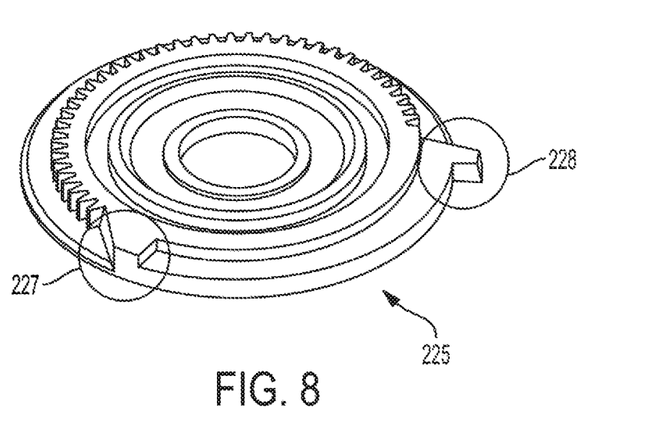
FIG. 8 is perspective view of the secondary gear of the retractor of FIG. 2.

In the disclosed embodiments, the ALR mechanism may be provided using the secondary gear 225 and a spring biased ALR lever. The ALR mechanism includes a lever 110 that is biased by a two position spring 115. For example, as shown in FIG. 2, the spring 115 may be configured as a metal strip with two bended portions. The bended portions provide nesting areas for the lever 110 so that the lever can be held in two different positions. As shown in FIG. 8, the secondary gear 225 includes a locking projection 228 and a retracting projection 227. The projections are located in different planes perpendicular to the axis of rotation of the spool.

Figure 9:
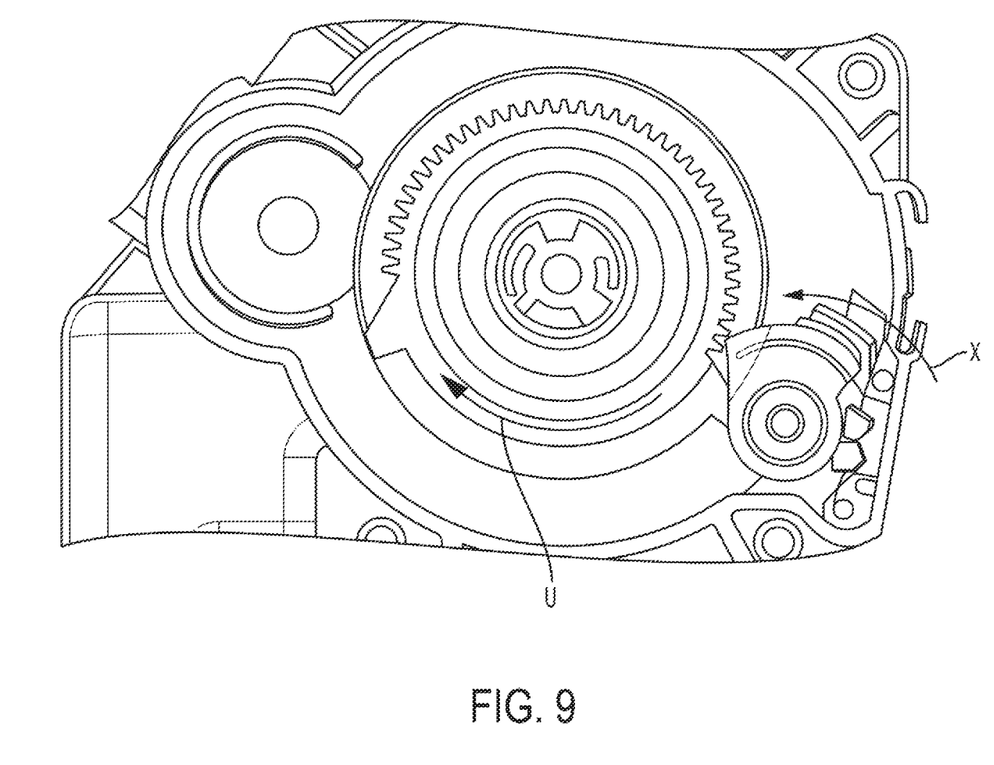
FIGS. 9-12 are side views the retractor of FIG. 2 showing the ALR mechanism in operation.
Figure 10:
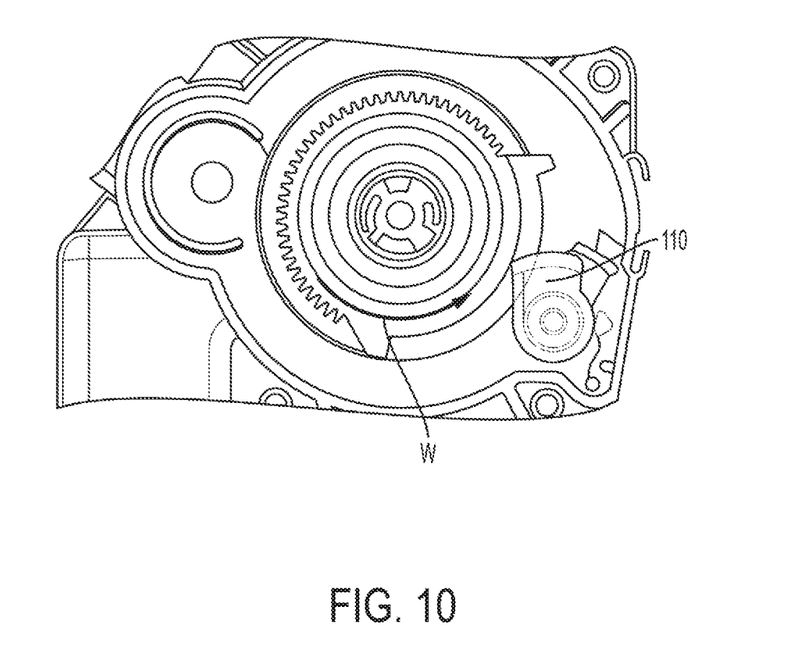
Figure 11:
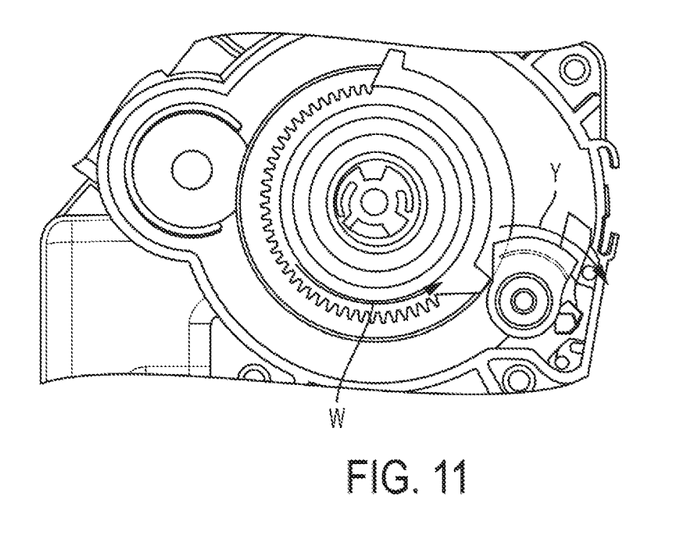
Figure 12:
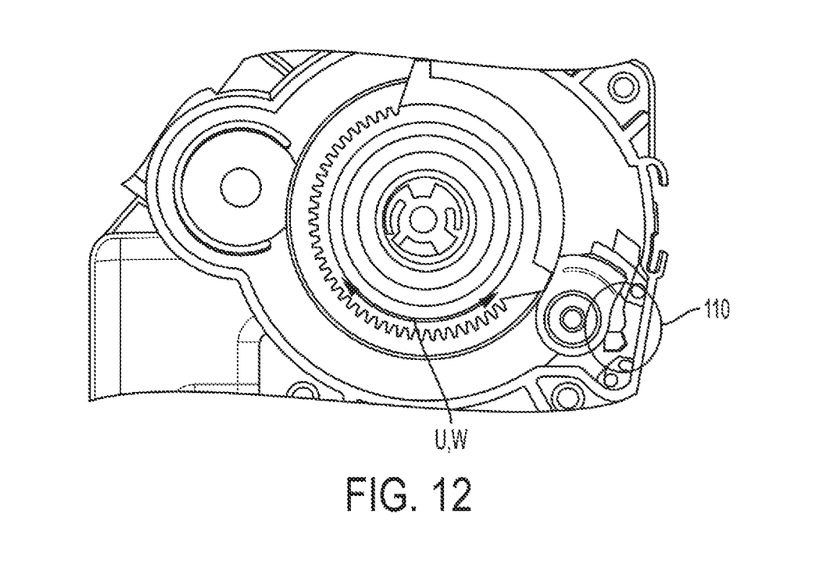

As shown in FIG. 9, when the webbing is at or close to a fully extracted condition from the spool, the locking projection 228 engages with the lever 110 to move the lever in the "X" direction to the "ON" position where the lever blocks movement of the secondary gear 225 in the extracting direction (direction "U"). As shown in FIG. 9, when the ALR mechanism is ON, the lever 110 is engaged with the teeth of the secondary gear 225. From the ON position, the secondary gear 225 may move in the retracting direction (direction "W") as shown in FIG. 10. However the lever 110 remains pivoted toward the secondary gear 225 and, thus, no extracting movement of the webbing beyond what is shown in FIG. 9 is possible. As the webbing is further retracted to a certain amount of webbing wrapped around the spool, the retraction projection 227 contacts the lever 110 (FIG. 11) to drive the lever 110 in the "Y" direction to the OFF position shown in FIG. 12. With the lever 110 and ALR mechanism in the OFF position, the retractor spool and webbing can move in either direction (retraction or extraction).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractors as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A seat belt retractor comprising:
    a spool for winding and unwinding a seat belt webbing;
    a measurement mechanism for determining a measure of the amount of seat belt webbing unwound from the spool, the measurement mechanism including
        a rotating cycloidal gear including a plurality of openings and wherein the rotation of the cycloidal gear is driven by rotation of the spool;
        a rotating secondary gear, wherein the secondary gear includes a plurality of pins and wherein each of the pins is located within one of the plurality of openings in the cycloidal gear and wherein rotation of the secondary gear is driven by rotation of the cycloidal gear;

a rotating sensing gear, wherein the sensing gear is engaged with the secondary gear, and wherein rotation of the sensing gear is driven by the secondary gear;

a magnet mounted to the sensing gear; and a sensor for detecting movement of the magnet, and wherein the sensor is configured to provided a signal to a controller for determining a measure indicating the amount of rotation of the spool and the amount of webbing withdrawal based on the movement of the magnet.

2. The seat belt retractor of claim 1, further comprising a second rotating cycloidal gear, wherein the second rotating cycloidal gear includes a plurality of openings and wherein the rotation of the second cycloidal gear is driven by rotation of the spool, and wherein each of the pins of the secondary gear is located within one of the plurality of openings in the secondary cycloidal gear and wherein rotation of the secondary gear is driven by rotation of the second cycloidal gear.

3. The seat belt retractor of claim 1, wherein the retractor is configured so that the sensing gear rotates less than a full revolution.

4. The seat belt retractor of claim 3, wherein the magnet is located proximate the center of the sensing gear.

5. The retractor of claim 1, further comprising an automatic locking (ALR) mechanism that includes a lever that is configured to engage the secondary gear.

6. The retractor of claim 5, wherein the ALR mechanism is configured so that when the webbing is fully extracted from the spool, and wherein the lever is engaged with the secondary gear thereby preventing further rotation of the spool in the unwinding direction.

7. The retractor of claim 6, wherein the secondary gear includes a retracting projection and a locking projection for engaging the lever and wherein the retracting projection engages the lever during retraction of the webbing to move the lever away from an ON position (in which extraction of the webbing is blocked) to an OFF position in which extraction of the webbing is permitted.

8. The retractor of claim 7, wherein the retracting projection is in a first plane and the locking projection is in a second plane and wherein the first and second planes to each other and perpendicular to the axis of rotation of the spool.

9. The retractor of claim 1, further comprising a second magnet configured to rotate with the spool and a second sensor for detecting movement of the second magnet, and wherein the second sensor provides a signal to the controller so that the controller can determine the measure indicating the amount of rotation of the spool and the amount of webbing withdrawal based on the movement of the second magnet.

10. The retractor of claim 9, wherein the second magnet is mounted to rotate at the same rate as the spool so that the second sensor can detect the angular position of the spool.

11. The retractor of claim 10, further comprising a shaft connected to the spool and extending through the gears of the measurement mechanism and a rewinding spring for biasing the spool in the winding direction, wherein the rewinding spring is connected to a bushing that is connected to the shaft and the second magnet is mounted to the bushing.

12. The retractor of claim 10, wherein the signals from the first and second sensors are provided to the controller to that the controller can determine the following additional measures indicating the direction of rotation of the spool, the velocity of rotation of the spool, and the acceleration of the webbing.

13. A seat belt retractor comprising:

a spool for winding and unwinding a seat belt webbing;

a measurement mechanism for determining a measure of the amount of seat belt webbing unwound from the spool, the measurement mechanism including a cycloidal gear transmission for transferring the rotational movement of the spool to rotational movement of a sensing gear, wherein the cycloidal gear transmission includes a primary gear including holes that are engaged with pins on a secondary gear so that at least one of the primary and secondary gears rotates eccentrically;

wherein rotational movement of the sensing gear is detected by a first sensor, and wherein the first sensor is configured to provide a signal to a controller for determining a measure indicating the amount of rotation of the spool and the amount of webbing withdrawal based on the movement of the sensing gear.

14. The seat belt retractor of claim 13, wherein the secondary gear rotates proportionally slower to the spool, wherein the retractor includes an automatic locking (ALR) mechanism that includes a lever that is configured to engage the secondary gear.

15. The retractor of claim 14, wherein the secondary gear includes a retracting projection and a locking projection for engaging the lever and wherein the retracting projection engages the lever during retraction of the webbing to move the lever away from an ON position (in which extraction of the webbing is blocked) to an OFF position in which extraction of the webbing is permitted.

* * * * *